(12) United States Patent
Yoshikawa et al.

(10) Patent No.: US 7,675,679 B2
(45) Date of Patent: Mar. 9, 2010

(54) IMAGE DISPLAY DEVICE AND FRESNEL LENS SHEET USED THEREFOR

(75) Inventors: Hiroki Yoshikawa, Hiratsuka (JP); Takanori Hisada, Yokohama (JP); Tetsu Ohishi, Hiratsuka (JP); Koji Hirata, Yokohama (JP); Daisuke Imafuku, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 581 days.

(21) Appl. No.: 11/474,150

(22) Filed: Jun. 22, 2006

(65) Prior Publication Data

US 2007/0146879 A1    Jun. 28, 2007

(30) Foreign Application Priority Data

Dec. 22, 2005  (JP)  ............................. 2005-369013
Mar. 6, 2006   (JP)  ............................. 2006-058851

(51) Int. Cl.
  *G03B 21/60*  (2006.01)
(52) U.S. Cl. .................. 359/457; 359/460; 359/742
(58) Field of Classification Search ................. 359/457, 359/460, 459, 742, 743
See application file for complete search history.

(56) References Cited

U.S. PATENT DOCUMENTS

| | | | |
|---|---|---|---|
| 6,804,055 B2 * | 10/2004 | Peterson et al. ............. | 359/457 |
| 7,095,558 B2 * | 8/2006 | Yoshikawa et al. .......... | 359/457 |
| 7,242,536 B2 * | 7/2007 | Suzuki et al. ............... | 359/742 |
| 2005/0046939 A1 | 3/2005 | Yoshikawa et al. | |
| 2006/0256433 A1 | 11/2006 | Yoshikawa et al. | |

FOREIGN PATENT DOCUMENTS

| | | |
|---|---|---|
| CN | 1598688 | 3/2005 |
| CN | 1685250 | 10/2005 |
| JP | 2004-170861 | 6/2004 |
| JP | 2004-170862 | 6/2004 |
| JP | 2004-273396 | 9/2004 |

OTHER PUBLICATIONS

State Intellectual Property Office of China (SIPO) office action dated Dec. 28, 2007 for the SIPO patent application CN2006-101077754.

* cited by examiner

*Primary Examiner*—Christopher Mahoney
(74) *Attorney, Agent, or Firm*—Townsend and Townsend and Crew LLP

(57) ABSTRACT

A Fresnel lens sheet used for an image display device is disclosed. The Fresnel lens sheet is provided with a first prism group in an area of a light entrance plane of the Fresnel lens sheet where the incident angle of light is equal to or more than a predetermined incident angle and a second prism group in an area of a light entrance plane of the Fresnel lens sheet where the incident angle of light is less than the predetermined value.

13 Claims, 10 Drawing Sheets

(a)

(b)

IMAGE DISPLAY DEVICE AND FRESNEL LENS SHEET USED THEREFOR

BACKGROUND OF THE INVENTION

This invention relates to a rear projection-type or direct viewing-type image display device and a Fresnel lens sheet used for both of these types of image display devices.

In a rear projection-type image display device for enlarging and projecting a small size image on a screen, reducing the volume of the device by reducing its depth, is generally desirable. If the depth dimension of the image display device and screen (herein often referred to as a "set") is reduced, the incident angle of light becomes wider on the screen, especially at the periphery of the screen. For this reason, the image display device's efficiency is decreased at the periphery of the screen. This is usually the result of reflection losses, and causes the screen image to be darker in the periphery. One conventional technology for coping with this reduction in display efficiency is disclosed in JP 2004-170862 A. That document discloses that a light entrance plane of a Fresnel lens sheet (image source side) as one constituent of a screen provided with a prism having a refraction plane and a total reflection plane. The light of large incident angle is refracted by the refraction plane onto the total reflection plane, and exits to the image observation side. It is also known to reduce the depth dimension of an image display device of the direct view type by using a plurality of cold cathode florescent lamps on a light entrance side that is the rear of the image source (for example, a liquid crystal panel) as disclosed in JP 2004-273396 A.

BRIEF SUMMARY OF THE INVENTION

In conventional image display device technology, the image display device is equipped with a total reflection prism on its entrance plane. When light is incident on the Fresnel lens sheet at a small incident angle, the image display device, having undergone total reflection in the total reflection prism, cannot provide incident light. The light that was not totally reflected becomes stray light (light that undergoes total reflection inside the Fresnel lens sheet and reaches a location other than a desired location) and reduces the contrast of an image. Moreover, the stray light causes uneven brightness of the image on the screen, an undesirable effect when uniform brightness across the screen is desired. Therefore, a total reflection prism is provided on the entrance plane. It is important to widen the range of incident angle of light on the screen that can be refracted effectively to the viewing side. That is, it is important to reduce the lower limit of the incident angle of light that can be totally reflected, so as to attain higher quality of an image.

In JP 2004-170862 A, at paragraph 0034 (TABLE 1), an image display device generation of stray light at an incident angle of 35 is 20% or more. The image display device described therein generates a comparatively large amount of stray light. It would be desirable to suppress the generation of stray light much further than that as described therein.

In the direct-view type image display device that uses, for example, a liquid crystal panel, a cold cathode florescent lamp is used to reduce the dimensions of the image display device. The direct view-type image display device's uniform brightness of light is attained using a reflector or diffuser to diffuse the light to portions of the liquid crystal panel where there are no lamps. However, in the liquid crystal panel, light not within a predetermined incident angle of light is a factor that leads to reduced contrast of the image. Because light is diffused and made incident on a liquid crystal panel, incident angles of light on the liquid crystal panel may have various values, including large values, causing the contrast of an image to degrade. To improve the contrast, light only of a predetermined incident angle is allowed to be incident on the liquid display panel. This control method, however, requires a new element for selecting the predetermined light from diffused light, whose addition in turn reduces efficiency.

In a direct view-type image display device using a liquid crystal panel, multiple fluorescent lamps are arranged at the rear of the liquid crystal panel. As the device ages, the florescent lamps lose luminance and eventually go dark. Since this degradation in the luminance differs from lamp to lamp, luminance is uneven in a displayed image. Therefore, if significant unevenness occurs in the luminance or lamps fail to light, lamp replacement is required. Because the lamps are arranged at the rear of the liquid crystal panel, replacement procedures are complicated.

This invention provides a technology whereby a high-quality image can be obtained in an image display device whose dimensions are reduced.

This invention provides an image display device that has a Fresnel lens sheet equipped with both a first prism group in an area of the light entrance plane of the Fresnel lens sheet on which light is incident at an angle equal to or more than a predetermined incident angle and a second prism group in an area of the light entrance plane of the Fresnel lens sheet on which light is incident at an angle less than a predetermined incident angle. The first prism group includes a first refraction plane that refracts light made incident thereon at an angle equal to or more than the predetermined incident angle of light and a first total reflection plane that reflects the light being refracted by the first refraction plane and directs it to the exit side of the Fresnel lens sheet. The second prism group includes a second refraction plane that refracts light incident thereon at an angle less than the predetermined incident angle of light and directs it to the exit side of the Fresnel lens sheet and a second total reflection plane that reflects a part of the light being refracted by the second refraction plane and directs it to the exit side of the Fresnel lens sheet.

Light reflected on the first total reflection plane of the prism group of the first prism group that is located away from the second prism group exits in a direction almost parallel to the normal of the Fresnel lens sheet; light reflected on the first total reflection plane of the prism group located near the prism group of the first prism group is made to exit in a direction slanting inward compared to the normal angle of the Fresnel lens. Light reflected by the second total reflection of the second prism group exits in a direction slanting inward as compared to the normal angle of the Fresnel lens. The area of the light exit plane of the Fresnel lens sheet that faces the prism group of the first prism group is planar. The area that faces the prism group of the first prism that is located near the second prism group may be provided with the third prism group. An area that faces the second prism group may be provided with the fourth prism group. This fourth prism group may include a third refraction plane for refracting light being refracted by the second refraction plane of the second prism and a fourth refraction plane for refracting light being reflected by the second total reflection plane, and this fourth prism may refract light from the second prism group in a direction almost parallel to the normal angle of the Fresnel lens sheet.

In addition, the configuration may include an area on which light is made incident at a smaller incident angle than that in the area where the second prism group is provided has a planar form, and a fifth prism group for refracting light incident on this planar area is provided in an area of the exit plane of the Fresnel lens sheet that faces the planar area.

The Fresnel lens sheet according to one aspect of the present invention may be used as one element of the screen that is used for the rear projection-type image display device, or may be disposed on the entrance side of the image source of the direct view-type image display device. In the process of attaching the Fresnel lens sheet to the set, the Fresnel lens sheet may be fixed to the case of the set by applying tension on the periphery of the Fresnel lens sheet, or may be fixed to the case of the set by warping the Fresnel lens sheet to direct its concave surface to the light source side of the set.

According to this aspect of the present invention, a high-quality image or high-luminance image can be obtained, in an image display device with reduced dimensions.

BRIEF DESCRIPTION OF THE DRAWINGS

FIG. 4 is a partially enlarged view illustrating optical effects of a first prism group 12a;

FIG. 5 is a partially enlarged view illustrating optical effects of a first prism group 12a and a third prism group 15a;

FIG. 7A is a vertical sectional view of the direct view type image display device;

FIG. 7B is a horizontal sectional view of the direct view type image display device;

DETAILED DESCRIPTION OF THE EMBODIMENTS

The following description of the invention, together with the accompanying drawings, should be referred to for the purpose of understanding the invention and advantages thereof.

First Embodiment

Figure 1:
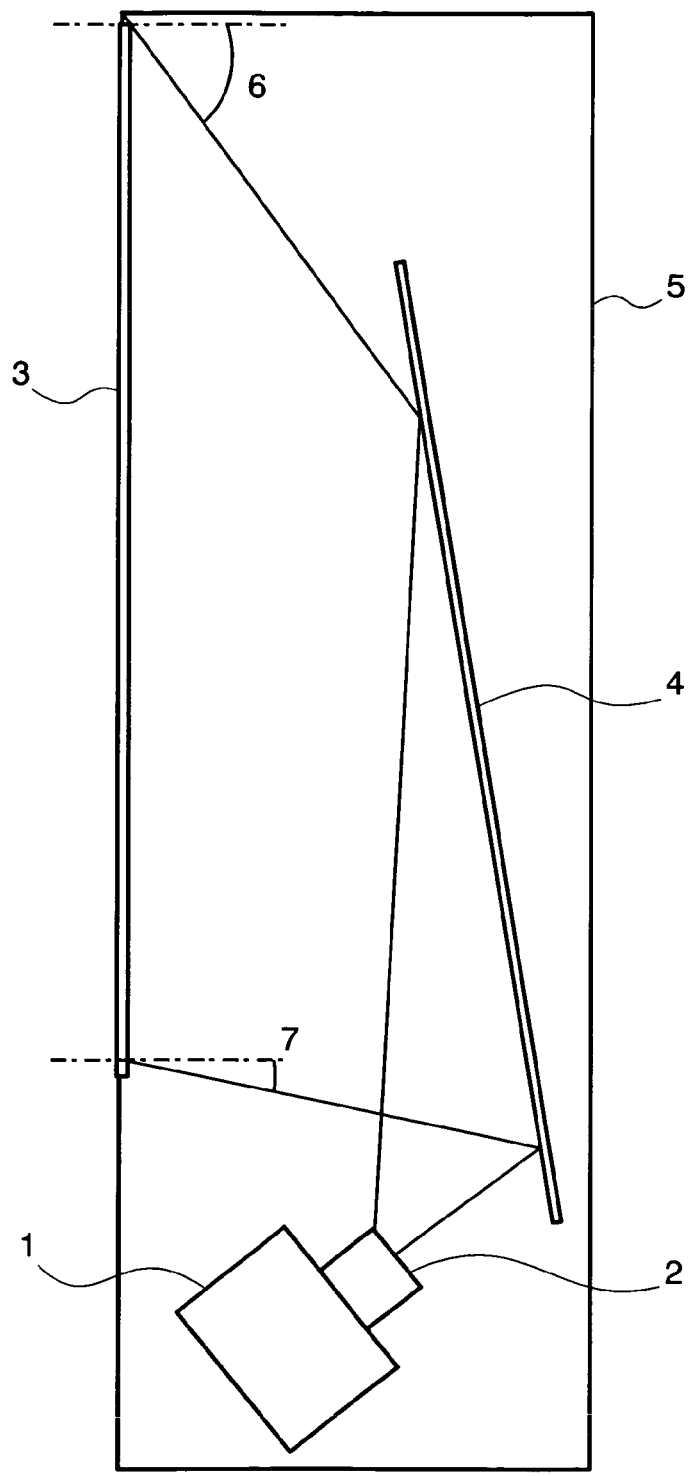
FIG. 1 is a view showing one configuration example of the rear projection type image display device to which this invention is directed.

FIG. 1 is a sectional perspective view of a rear projection-type image display device according to this invention. An image source 1 consists of a projection type cathode ray tube, a reflection or transparent liquid crystal panel, or an image modulating element, such as a display element, equipped with a plurality of minute mirrors, etc., that displays a small-size image. A projector lens 2 enlarges the small size image displayed on the display screen of the image source and projects it on a rear projection type screen 3. A reflecting mirror 4 is provided in the middle of an optical path extending from the exit side of the projector lens 2 to the entrance side of the screen 3. Therefore, the image enlarged by the projector lens 2 is reflected and projected on the rear of the screen 3 by the reflecting mirror 4. This configuration reduces the width dimensions of the image display device. These embodiments of the present invention are housed inside a case 5 and fixed in predetermined positions. To reduce the depth dimension of the case to, for example, 300 mm or less, the range of incident angle to the rear projection type screen will be about 30°-70°. That is, when a minimum incident angle 7 is approximately 30°, it is necessary for a maximum incident angle 6 to be approximately 70°.

Figure 2:
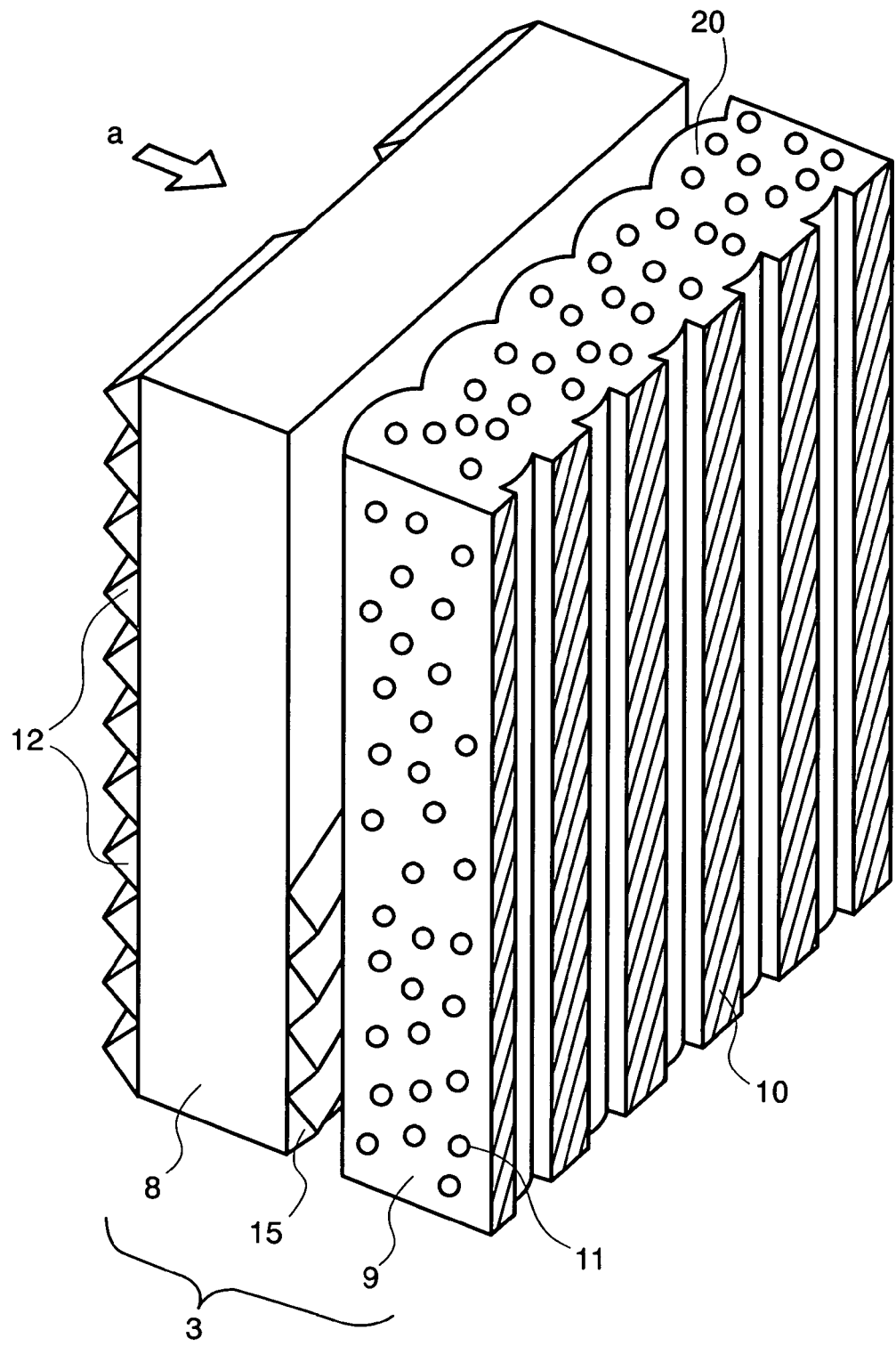
FIG. 2 is a view showing one configuration example of a transparent screen according to this invention.

FIG. 2 shows one configuration example of the rear projection type screen 3 used for the image display device according to this invention. This rear projection type screen 3 is equipped with a Fresnel lens sheet 8 and a lenticular lens sheet 9 acting as a diffuser sheet. Fresnel lens sheet 8 has a formation of a total reflection prism 12 on its light entrance plane and a formation of a refraction-type prism 15 on its light exit plane. According to an embodiment of the rear projection-type screen 3 of this structure, the enlarged and projected image being projected from a direction of an arrow (a) of the figure is converted to light substantially parallel to the normal angle of the principal plane of the Fresnel lens sheet (i.e., the light of an exit angle, which is an angle of exit light, with respect to the normal angle, of substantially 0°) or light slightly inclined inward, by means of the Fresnel lens sheet 8, i.e., by means of the refraction type prisms 15 formed on the Fresnel lens sheet. This light is made incident on lenticular lens sheet 9, and diffused in the horizontal and vertical directions in the figure.

On the light entrance side of the lenticular lens sheet 9, a plurality of lenticular lenses 20, each of which has its long side directed in the vertical direction of the screen, is arranged in the horizontal direction of the screen, as shown in FIG. 2. This lens arrangement diffuses the image light from the Fresnel lens sheet 8 in the horizontal direction of the screen. Moreover, on the exit side of the lenticular lens sheet 9, a plurality of black stripes 10 extending in the vertical direction of the screen is arranged in the horizontal direction of the screen. These black stripes 10 absorb external light entering from the exit side of the screen. Furthermore, this lenticular lens sheet 9 is made from a transparent resin material in which an optical diffuser material 11 is mixed. This mixed optical diffuser material 11 acts to diffuse image light in the horizontal direction and vertical direction in the screen. In addition, a transparent reinforcing sheet may be disposed in front of lenticular lens sheet 9. Furthermore, this reinforcing sheet and lenticular lens sheet 9 may be glued together as a single piece, and thereby mechanical strength of lenticular lens sheet 9 may be improved. Moreover, the lenticular sheet 9 may not contain optical diffuser material 11, but the reinforcing sheet disposed in front of lenticular lens sheet 9 may contain such material. In this embodiment, there exist two kinds of reflection-type prisms 12 of the Fresnel lens sheet 8 shown in FIG. 2. The first kind is exemplified in the first prism group provided in an area of the light entrance plane of the Fresnel lens sheet 8 whose incident angle of light is equal to or more than a predetermined incident angle of light (for example, 40° or more, or 50° or more). The second kind is exemplified in the second prism group provided in an area thereof whose incident angle of light is less than the predetermined incident angle. The first prism group includes a first refraction plane for refracting light that is incident thereon at the predetermined incident angle or more, and a first total reflection plane for reflecting light being refracted by the this first refraction plane and directing it to the exit side of the Fresnel lens sheet. The second prism group includes a second refraction plane for refracting light that is incident thereon at an angle less than the predetermined incident angle and directing the light to the exit side of the Fresnel lens sheet 8, and a second total reflection plane for reflecting a part of the light being refracted by this second refraction plane and directing the light to the exit side of Fresnel lens sheet 8. Moreover, on the exit plane of Fresnel lens sheet 8, a third prism group and a forth prism group are provided as refraction-type prisms. This third prism group is provided in an area that faces the first prism group located near the second prism group provided on the entrance plane. The third prism group includes a fifth refraction plane for further refraction of the light that is being refracted by the first refraction plane of the first prism group and being reflected by the first total reflection plane. The fourth prism group facing the second prism group includes a third refraction plane for further refracting the light being refracted by the second refraction plane of the second prism and a fourth refraction plane for refracting the light being reflected by the second total reflection plane of the second prism group. In addition, on an area that faces the first prism group on the exit plane of Fresnel lens sheet 8 and is not an area located near the second prism group, a first planar area 17 that is planar and does not have a formation of prisms is provided.

Figure 3:
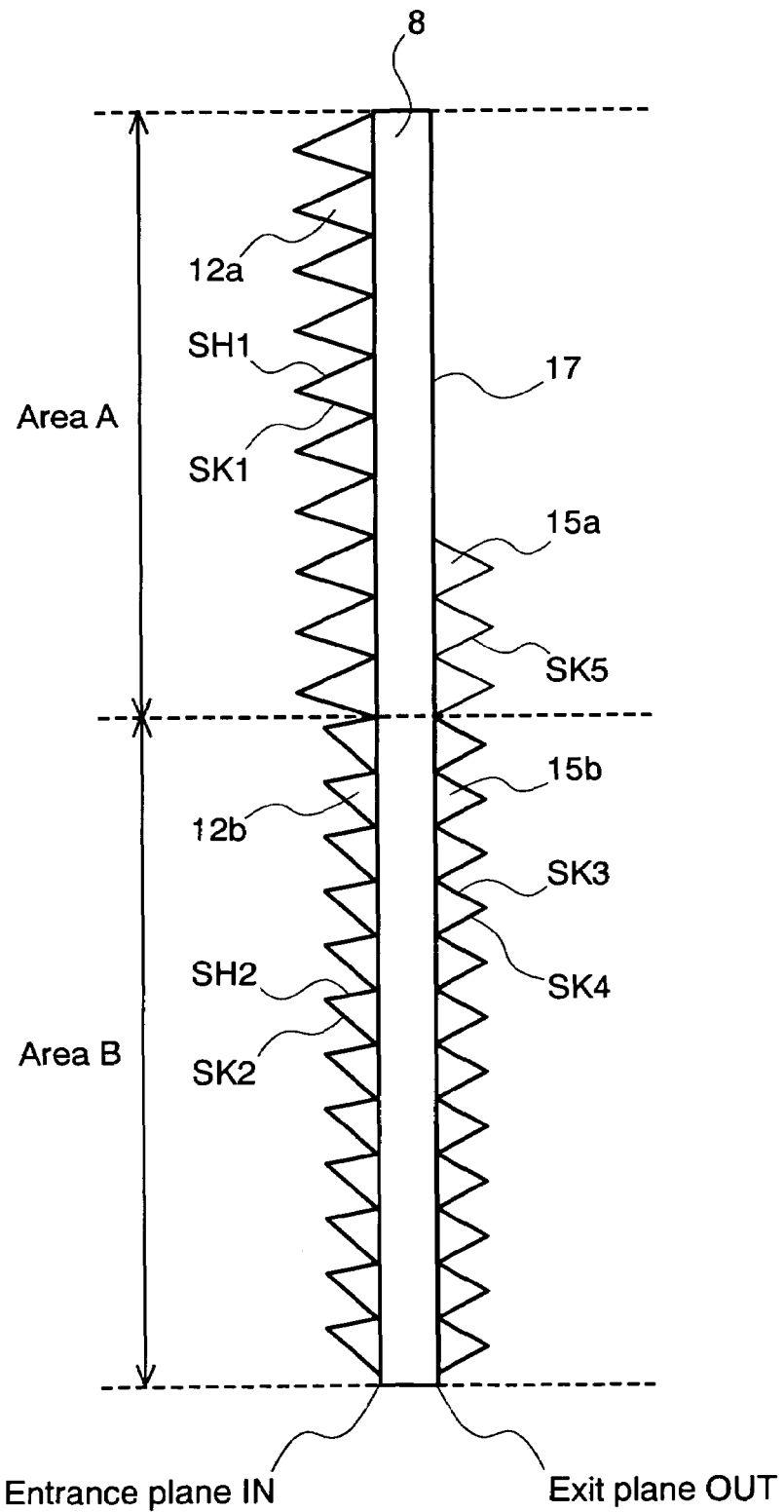
FIG. 3 is a vertically sectional view showing the entire structure of a Fresnel lens sheet according to a first embodiment of this invention.

FIG. 3 shows an entire structure of Fresnel lens sheet 8. FIG. 3 shows a vertically sectional view of Fresnel lens sheet 8 according to this embodiment. As shown in FIG. 3, in this embodiment, Fresnel lens sheet 8 is segmented into two areas depending on the light incident angle with respect to the vertical direction. An area A is an area on which the light is made incident at an incident angle of, for example, 45°-70° (maximum incident angle). An area B is an area on which the light is made incident at an incident angle of, for example, 30° (minimum incident angle) to 44°.

In area A of a light entrance plane IN of the Fresnel lens sheet 8, a first prism group 12a that has both first refraction plane SK1 and a first total reflection plane SH1 described above is provided; in area B, a second prism group 12b that has both a second refraction plane SK2 and a second total reflection plane SH2 described above is provided. Alternatively, in area A of a light exit plane OUT of Fresnel lens sheet 8, first planar area 17 and a third prism group 15a described above are provided. Third prism group 15a has a fifth refraction plane SK5 and is provided in a position where third prism group 15a faces first prism group 12a located in a predetermined range away from a boundary between area A and area B. First planar area 17 faces first prism group 12a in an area other than the predetermined area. Moreover, in area B of light exit plane OUT, a fourth prism group 15b that has both a third refraction plane SK3 and a fourth refraction plane SK4 is formed. Thus, whereas third prism group 15a is formed in the area that faces first prism group 12a, fourth prism group 15b is provided in the area that faces second prism group 12b.

Although, in this embodiment, each of the first through fifth prisms described above is formed in such a way that a long-side direction of its refraction planes is parallel to the horizontal direction of the screen, these prisms may be formed in the shape of concentric circles having a center at a certain point. Moreover, each of the first and second prisms on the entrance plane may be formed in such a way that a long-side direction of its refraction planes is parallel to the horizontal direction of the screen, and the third and fifth prisms on the exit plane may be formed in the shape of concentric circles.

Figure 4:
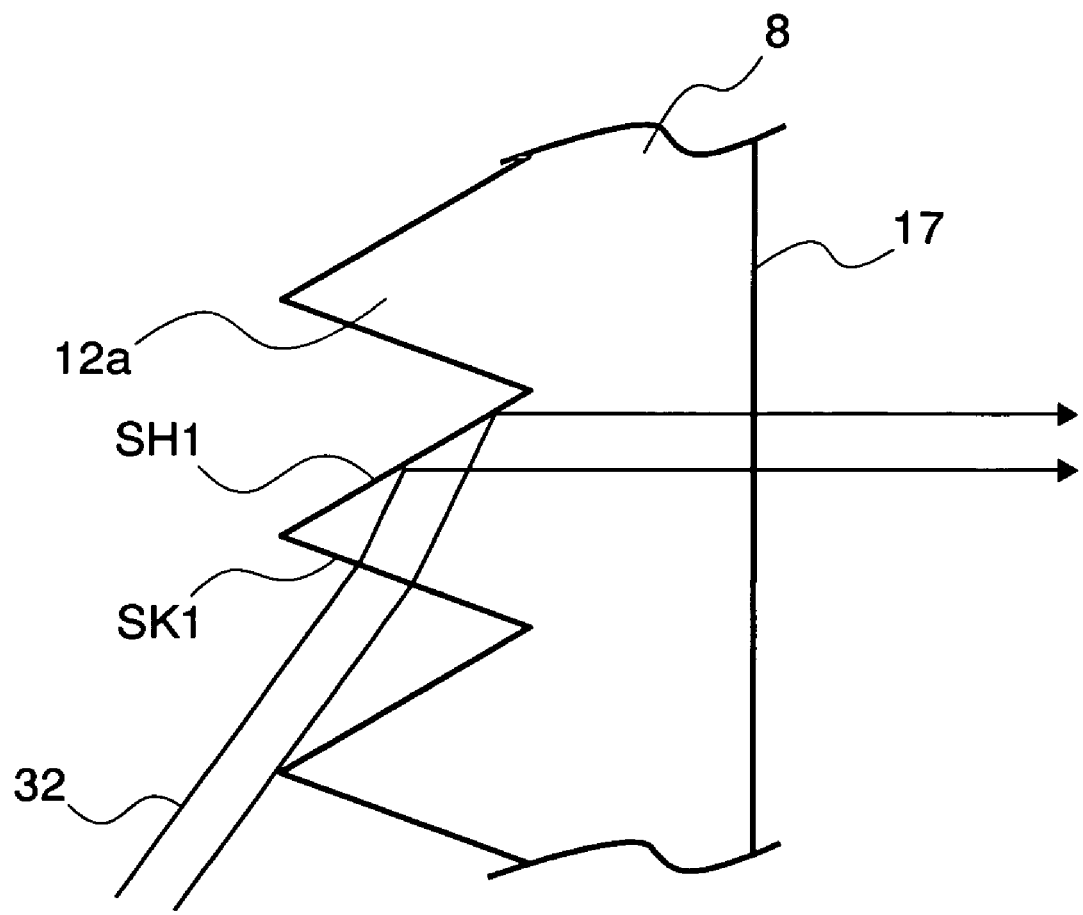
Figure 5:
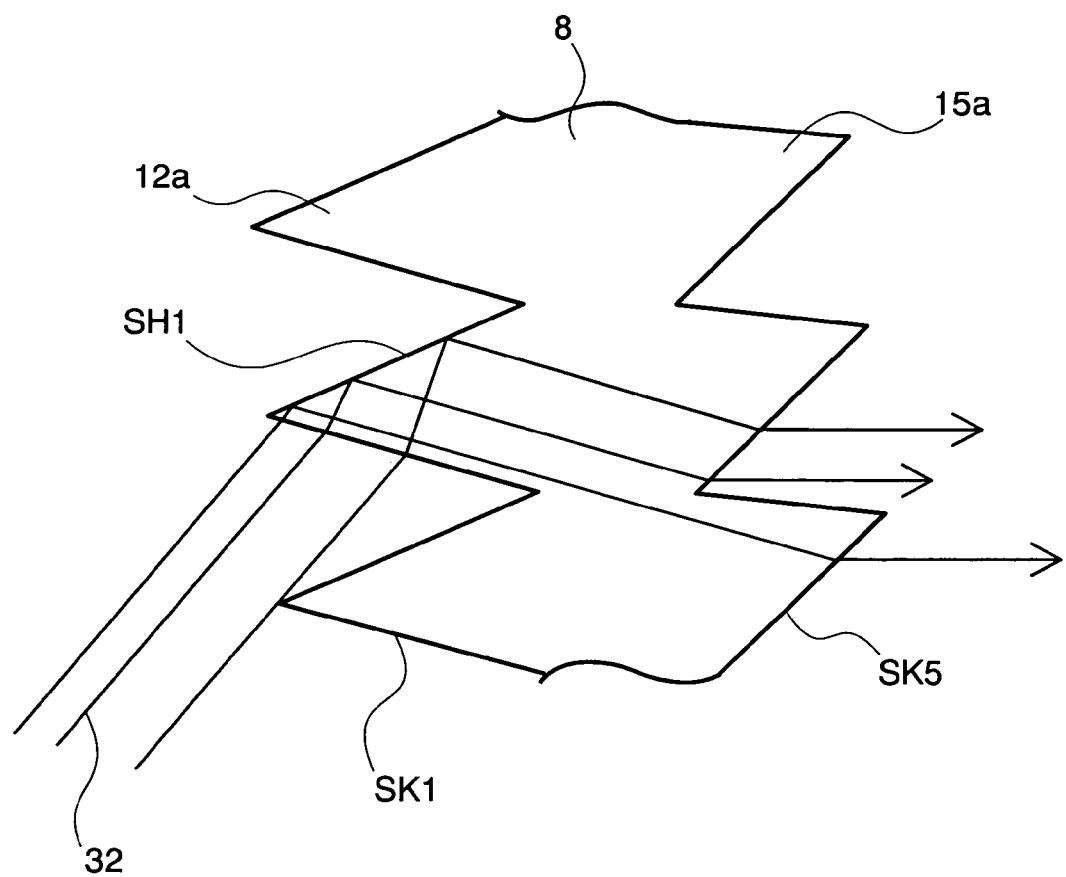
Figure 6:
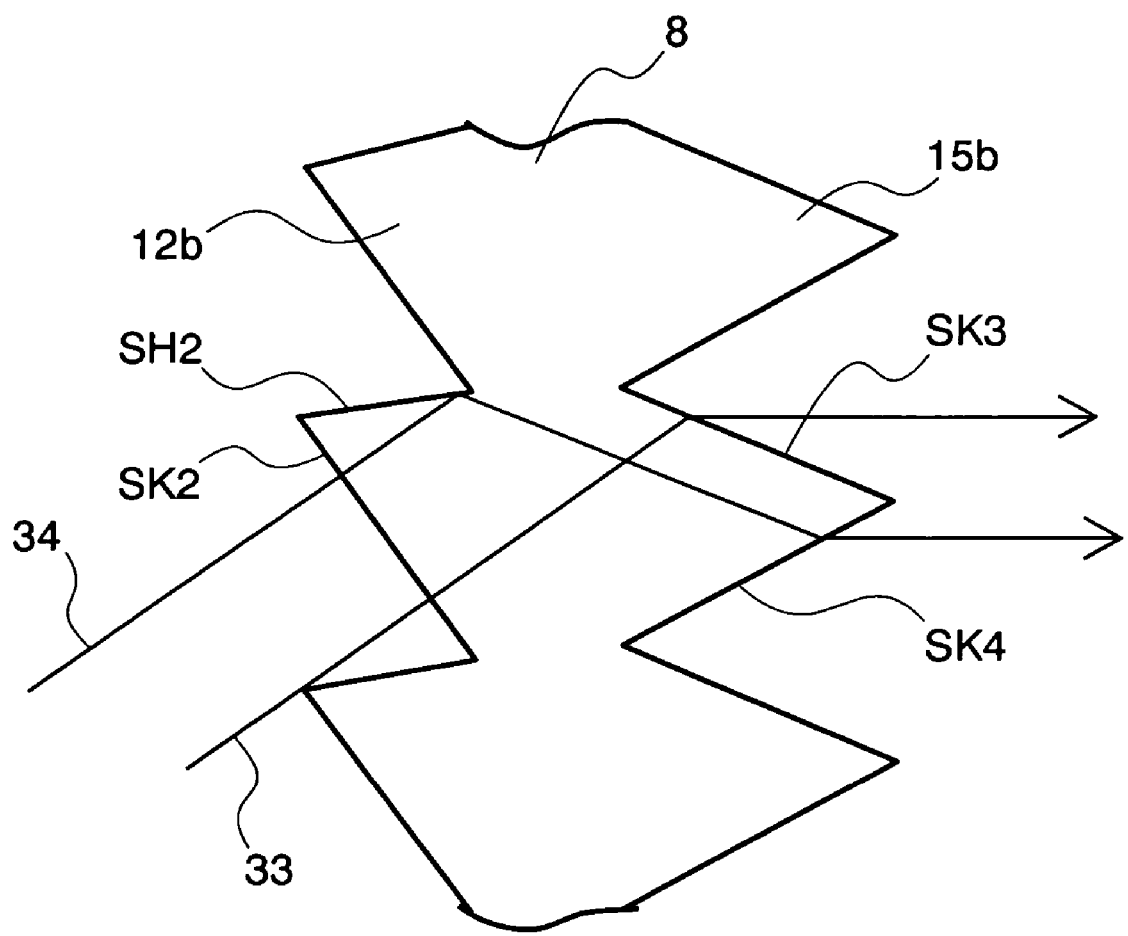
FIG. 6 is a partially enlarged view explaining optical effects of a second prism group 12b and a fourth prism group 15b.

Operation of the prisms, i.e., optical effects, will now be explained with reference to FIGS. 4, 5, and 6. FIG. 4 is a partially enlarged sectional view of a part of first prism group 12a and the first planar area 17, both located in area A. Specifically, FIG. 4 shows a part of the area A in which the incident angle is especially large, and which is not provided with third prism group 15a on its exit plane. In area A, a part on which light is made incident at a larger incident angle, as shown in FIG. 4, is provided with first prism group 12a on the light entrance plane of Fresnel lens sheet 8 and provided with first planar area 17 on the light exit plane thereof. A light ray 2 from the image source side is made incident on a first refraction plane SK1 of the first prism group and refracted by the first refraction plane SK1. Subsequently, it is totally reflected by the first total reflection plane SH1, and exits to the viewing side from first planar area 17 on the exit plane of Fresnel lens sheet 8. The exit direction of the light ray at this stage is almost parallel to the normal angle of the principal plane of Fresnel lens sheet 8.

Optical effects of a portion included in area A that is located near the area B will now be explained. FIG. 5 shows an enlarged sectional view of first prism group 12a located near area B, and third prism group 15a facing the first prism group. As shown in FIG. 5, first prism group 12a is provided on the light entrance plane of Fresnel lens sheet 8, and third prism group 15a is provided on the light exit plane thereof. A light ray 34 from the image source is made incident on first refraction plane SK1 of the first prism group and refracted by this first refraction plane SK1. The refracted light is totally reflected by first total reflection plane SK1 and made incident on fifth refraction plane SK5 of the third prism group. The light made incident on fifth refraction plane SK5 is refracted by fifth refraction plane SK5 to be almost parallel to the normal angle of the principal plane of Fresnel lens sheet 8. More specifically, fifth refraction plane SK5 of third prism group 15a is for refracting the light that is directed inward by first total reflection plane SK1 of first prism group 12a in the normal direction.

In area B in which the light is made incident at an incident angle smaller than that of area A, second prism group 12b is provided on the light entrance plane of Fresnel lens sheet 8. Moreover, fourth prism group 15b is provided on the light exit plane of Fresnel lens sheet 8. Light ray 34 from the image source side is made incident on second refraction plane SK2 of the second prism group and refracted by this second refraction plane SK2. The refracted light is totally reflected by second total reflection plane SH2 and made incident on fifth refraction plane SK4 of fourth refraction plane SK4 of fourth prism group 15b. The light made incident on fourth refraction plane SK4 is refracted by fourth refraction plane SK4 to be almost parallel to the normal angle of the principal plane of Fresnel lens sheet 8. That is, fourth refraction plane SK4 of fourth prism group 15b functions to refract the light that was directed inward by second total reflection plane SK2 of second prism group 12b in the normal direction. Alternatively, a light ray 33 is made incident on second refraction plane SK2 of the second prism group and refracted by this second refraction plane SK2, and subsequently made incident on third refraction plane SK3 of fourth prism group 15b. This light is refracted to be almost parallel to the normal angle of the principal plane of Fresnel lens sheet 8 by third refraction plane SK3. Specifically, third refraction plane SK3 of third prism group 15b refracts light in the normal direction that was not totally reflected by second total reflection plane SK2 of second prism group 12b.

Thus, second total reflection plane SH2 of second prism group 12b reflects a part of light that is made incident on second refraction plane SK2 and refracted thereby. Specifically, light made incident on second refraction plane SK2 of second prism group 12b is made to exit from the Fresnel lens sheet mainly via two routes, i.e., a route passing through second total reflection plane SH2 and fourth refraction plane SK4; and a route passing through third refraction plane SK3.

Here, an angle that the light ray refracted by second refraction plane SK2 of second prism group 12b forms with the principal plane of Fresnel lens sheet 8 is set smaller than a slant angle of fourth refraction plane SK4 of fourth prism group 15b. Moreover, an angle that the light ray being totally reflected by second total reflection plane SH2 of second prism group 12b forms with the principal plane of Fresnel lens sheet 8 is set smaller than a slant angle of third refraction plane SK3 of fourth prism group 15b. If the image display device is set up in this way, the light being refracted by second refraction plane SK2 is made incident only on third refraction plane SK3 that the light should enter, without being incident on fourth refraction plane SK4. Moreover, the light being refracted by second total reflection plane SH2 is made incident only on fourth refraction plane SK4 so that the light should enter, without being incident on third refraction plane SK3. For this reason, it becomes possible to make almost all the light rays being incident on Fresnel lens sheet 8 exit from Fresnel lens sheet 8. Therefore, according to this embodiment, the Fresnel lens sheet can reduce generation of unnecessary light significantly even when light is made incident thereon at a wide range of incident angles.

TABLE 1 below shows one example of specifications of optical components (prisms) where Fresnel lens sheet 8 is applied to an image display device. These specifications show one example of the following concrete values: slant angles of refraction planes SK1, SK2 of first and second prism groups 12a, 12b provided on the light entrance plane of Fresnel lens sheet 8, apex angles of the two prisms (12a, 12b), slant angles of refraction planes SK4, SK5 of third and fourth prism groups 15a, 15b provided on the light exit plane thereof, and apex angles of the two prisms (15a, 15b). In addition, in this example, the refractive index of a material that makes up the Fresnel lens sheet is set to 1.53. In TABLE 1, incident angles from 31° to 44° correspond to area B, and incident angles from 45° correspond to area A. Moreover, a range from 45° to 640 in the range of area A is a range for which third prism group 15a is provided on the light exit plane. The slant angle of the prism refraction plane becomes smaller with increasing incident angle, and the refraction plane connects to first planar area 17 at an incident angle of 65°. More specifically, for the range from 65° to 70° in area A, first planar area 17 is allocated to its light exit plane.

TABLE 1

| Incident angle | Slant angle of entrance side prism refraction plane | Prism apex angle of entrance side prism | Slant angle of exit side prism refraction plane | Prism apex angle of exit side prism |
| --- | --- | --- | --- | --- |
| 31° | 28° | 64° | 60.7° | 52.4° |
| 44° | 53° | 45.4° | 67.4° | 24.7° |
| 45° | 54° | 44° | 70° | 21.8° |
| 64° | 54° | 66° | 1.5° | 90.4° |
| 65° | 52.2° | 68.1° | — | — |
| 70° | 44.3° | 71.6° | — | — |

Whereas, in the image display device disclosed in JP 2004-170862 A, the generation rate for stray light is 20% or more at an incident angle of 35°. According to this embodiment, even for an incident angle of 31°, it is possible to suppress the generation rate of stray light to almost 0%. Accordingly, since all incident light rays act as effective light rays, the angular range of the screen incident angles of image light becomes wide, and transmission efficiency is simultaneously improved. Therefore, it will be understood that according to this embodiment, unnecessary light on the screen can be reduced.

Further, according to this embodiment, if Fresnel lens sheet 8 is applied to the rear projection-type image display device, a bright image can be displayed even in a screen periphery while the depth dimension of the set is reduced. Therefore, in this embodiment, in an image display device with a diagonal of 50 inches (ratio of height vs. width=9:16), the breadth of the device can be reduced to approximately 300 mm, thus illustrating that further reduction in depth dimension of the device is possible. Although the preferred embodiments of the invention have been disclosed for illustrative purposes, those skilled in the art will appreciate that various modifications, additions and substitutions are possible, without departing from the scope and spirit of the invention as disclosed in the accompanying claims. For example, in conformity with specifications of a slanting projection angle, those skilled in the art can alter the values of a slanting projection angle or a projection distance, with or without the presence of a reflecting mirror, i.e., while not being limited to a planar surface.

Moreover, to further reduce the depth dimension of the device, a curved mirror having a free shaped surface may be used. In this case, prism surfaces (refraction planes) of the Fresnel lens that makes up the Fresnel lens sheet may take the form of an aspherical surface (normally a spherical surface) that eliminates any discrepancy between a spherical system and a curved mirror. The aspherical surface coefficient (the coefficient expressing the degree of an asphericity with a polynomial) is then set in such a way that a projected image being reflected by the curved mirror and made incident on Fresnel lens sheet 8 exits from the exit side of Fresnel lens sheet 8 at an exit angle of substantially 0° for a substantially whole plane of the rear projection type screen.

Thus, according to this embodiment, the range of the screen incident angle of image light is widened and stray light is diminished, thus improving efficiency. Accordingly, a rear projection-type image display device can be more compact, yet display a bright image with excellent contrast.

Second Embodiment

Figure 7:
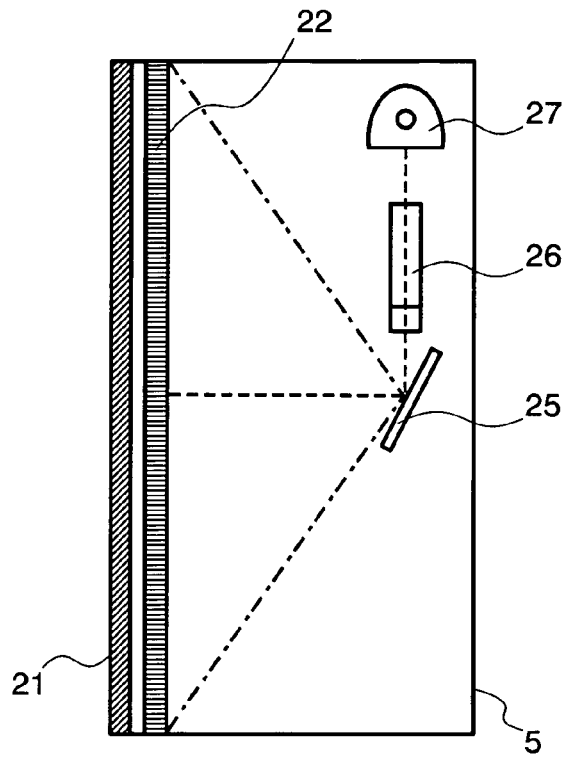
FIGS. 7A and 7B are views showing one configuration example of the direct view type image display device.
Figure 7:
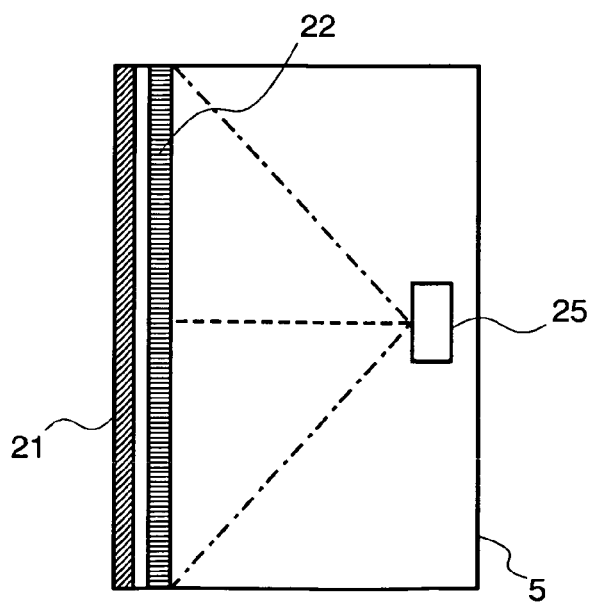

A second embodiment of this invention will be described with reference to FIGS. 7 to 9. FIG. 6 shows one configuration example of the direct view-type image display device to which this invention is directed. FIG. 7A is a sectional view of the device viewed from above. FIG. 7B is a sectional view of the device viewed from the side.

A light source 27 includes a high pressure mercury lamp of a substantially point source and a reflector that reflects light emitted from this lamp and makes the light exit from the lamp. Brightness of light emitted from light source 27 is rendered uniform by a rod lens 26. As for other methods for rendering the brightness uniform, another embodiment is comprised of a method that uses a multiple lens array etc. In this embodiment, the light exiting from rod lens 26 is reflected by a reflecting mirror 25 that is one component of the projection unit, and enlarged and projected on an image source 21 through a Fresnel lens sheet 22. Here, the imager source 21 is constructed with, for example, a transparent liquid crystal panel, and forms an image on a display surface by modulating for each pixel light having passed through Fresnel lens sheet 22. In this embodiment, image source 21 is configured so that the light is made incident on the liquid crystal panel through Fresnel lens sheet 22. Fresnel lens sheet 22 is configured to convert the incident light into collimated light (light parallel to the normal angle of the principal plane of Fresnel lens sheet 22) and makes the light exit to the liquid crystal panel. Accordingly, as an optical effect of the Fresnel lens sheet 22, incident light on the liquid crystal panel is mainly parallel to the normal angle of the liquid crystal panel display surface.

Here, as elements for enlarging light from rod lens 26 to size of the image source 21, for example, a known enlarging lens, a reflecting mirror with a curved shape, and the like can be used. Such an element may be provided in a path from light source 27 to reflecting mirror 25. Moreover, reflecting mirror 25 may have a curved shape. Attached to or housed in case 5 are reflecting mirror 25, rod lens 26, light source 27, image source 21, and Fresnel lens sheet 22.

In the image display device of such a configuration, the greater the angle of enlarged light rays incident on the periphery of the Fresnel lens sheet, the greater the reduction in size the image display device can be. For example, in an image display device whose display surface is 50 inches in diagonal (ratio of height vs. width=9:16), if a maximum incident angle at which the light is incident on the periphery of Fresnel lens sheet 22 is approximately 800, the set can be reduced in dimension to approximately 150 mm. Therefore, in order to reduce the depth dimension of the set to 150 mm or less, the range of incident angle to Fresnel lens sheet 22 becomes about 0°-80° or so. According to this embodiment, Fresnel lens sheet 22 converts the incident light having such an angular range into collimated light and makes the collimated light exit to the liquid crystal panel.

Figure 8:
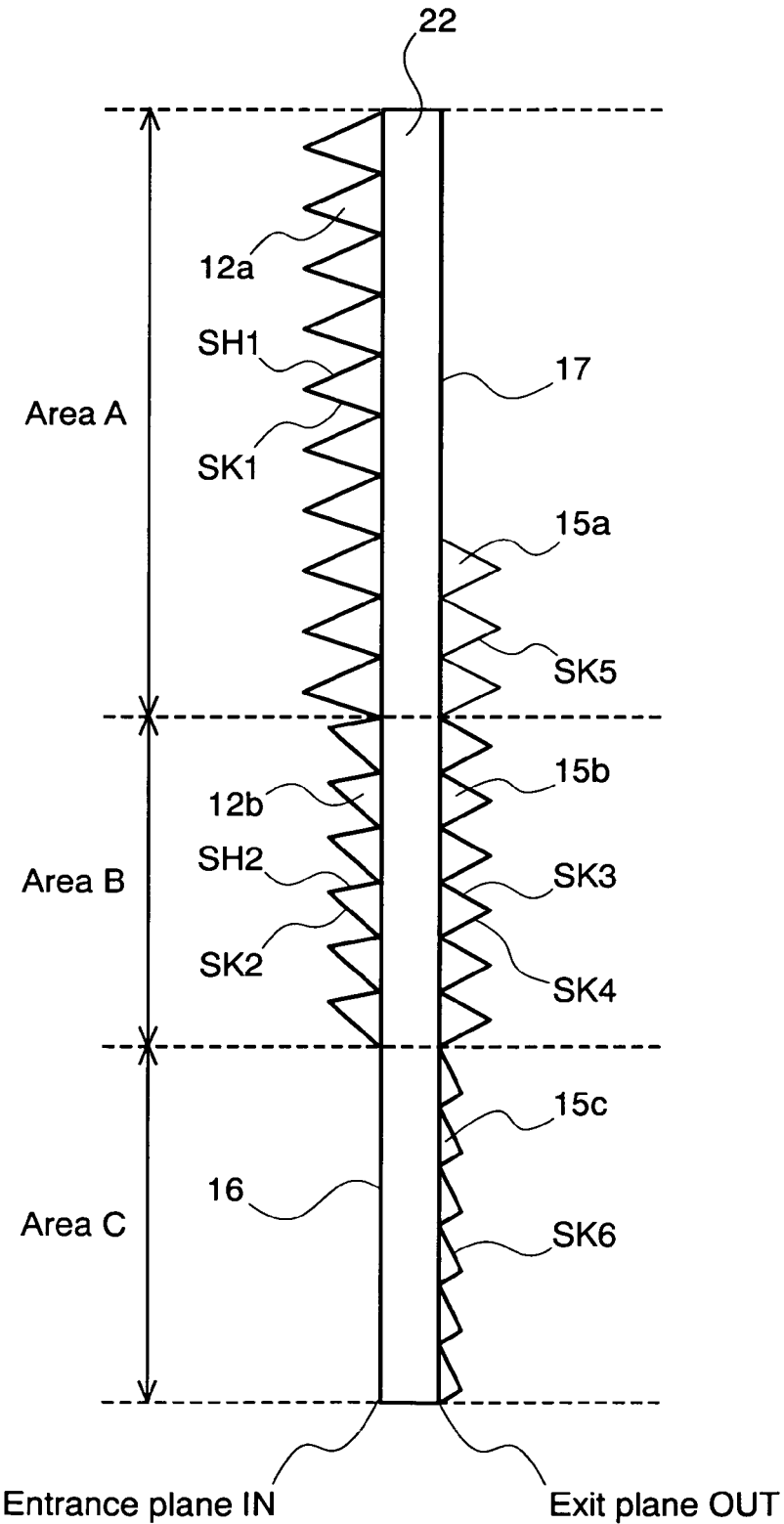
FIG. 8 is a vertical sectional view showing an entire structure of the Fresnel lens sheet according to a second embodiment of this invention.

FIG. 8 shows an entire structure of Fresnel lens sheet 22 suited to be applied to an image display device of reduced dimensions. FIG. 8 shows a vertically sectional view of Fresnel lens sheet 22 according to this embodiment. In FIG. 3, Fresnel lens sheet 8 is vertically segmented into two areas depending on the incident angle of light. In this embodiment, Fresnel lens sheet 22 is vertically segmented into three areas depending on the incident angle of light. Area A is an area on which light is made incident at an incident angle of, for example, 45°-80° (the maximum incident angle). Area B is an area on which light is made incident at an incident angle of, for example, 31°-44°. Area C is an area on which light is made incident at an incident angle of, for example, 0°-30° (the minimum incident angle).

In area A on light entrance plane IN of Fresnel lens sheet 22, first prism group 12a has both first total reflection plane SK1 and first total reflection SH1; in area B thereof, a second prism group 12b has a second refraction plane SK2 and a second total reflection plane SH2. Moreover, in area C on light entrance plane IN, a second planar area 16 is planar and does not have a formation of prisms. Alternatively, in a portion included in area A on light exit plane OUT of Fresnel lens sheet 22, first planar area 17 is planar and does not have a formation of prisms; in another portion included in area A of light exit plane OUT, located near area B, third prism group 15a has the fifth refraction plane SK5. In area B on the light exit plane OUT, fourth prism group 15b has both third refraction plane SK3 and fourth refraction plane SK4; in area C, a fifth prism group 15c has a sixth refraction plane SK6.

Although, in this embodiment, each of the first to fifth prisms described above is formed in such a way that a long-side direction of its refraction planes is parallel to the horizontal direction of the screen, these prisms may be formed in the shape of concentric circles having a center at a certain point. Alternatively, each of the first and second prisms described above is formed in such a way that a long-side direction of its refraction planes is parallel to the horizontal direction of the screen, and the third to fifth prisms on the exit plane may be formed in the shape of concentric circles.

Next, the optical effects of the prisms will be explained with reference to FIG. 9. First prism group 12a and third prism group 15a in area A and second prism group 12b and fourth prism group 15b in the area B have the substantially identical optical effects as those of the prisms explained above in FIG. 4 to FIG. 6. Therefore, explanations of optical effects and the setting of angles of first prism group 12a, second prism group 12b, third prism group 15a, and fourth prism group 15b have been omitted. Only the optical effects of fifth prism group 15c, provided in area C, will be explained.

Figure 9:
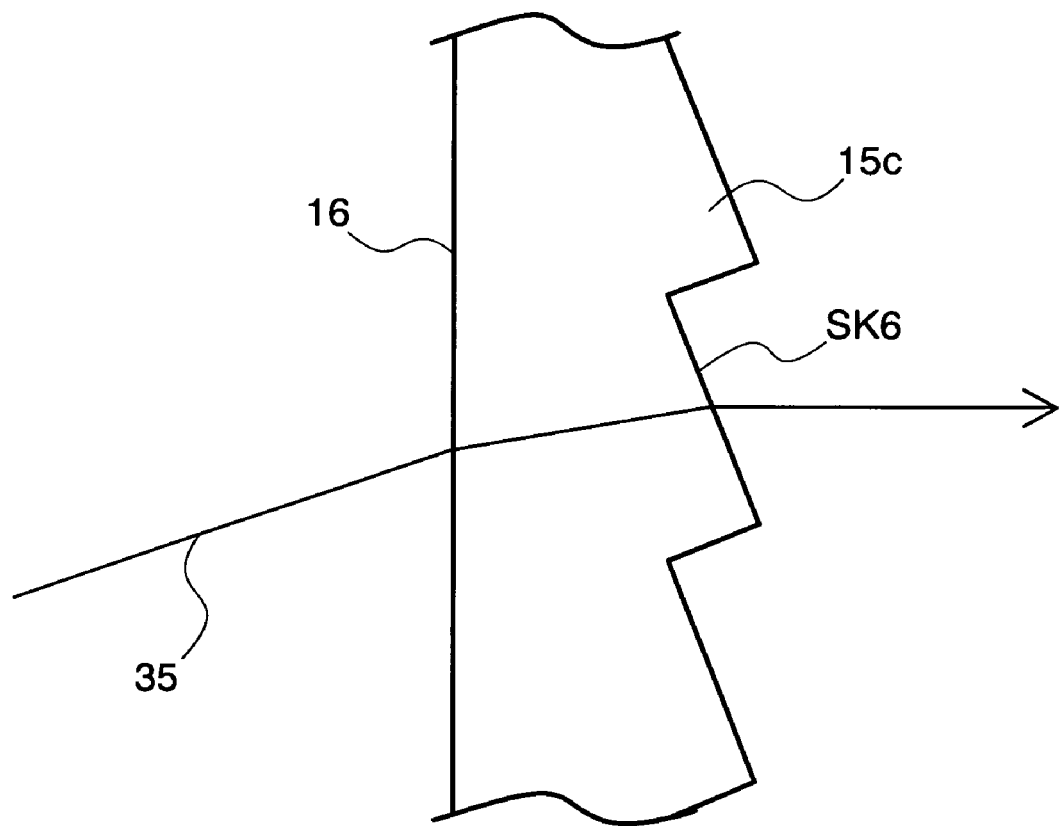
FIG. 9 is a partially enlarged view illustrating an optical action of a fifth prism group 15c.

As shown in FIG. 9, area C on the light entrance plane IN of Fresnel lens sheet 22 is provided with a second planar area 16. In area C on light exit plane OUT, fifth prism group 15c is provided to face second planar area 16. A light ray 35 from light source 27 (light rays with incident angles of, for example, 0°-30°) is incident on second planar area 16 and refracted by an entrance plane of this second planar area 16. The light being refracted in second planar area 16 is made incident on sixth refraction plane SK6 of fifth prism group 15c. This light is refracted by sixth refraction plane SK6 of fifth prism group 15c and exit in a direction almost parallel to the normal angle of the principal plane of Fresnel lens sheet 22. Light refracted by sixth refraction plane SK6 is made to exit to image source 21 constructed quid crystal panel etc.

FIG. 2 is an example of the specifications for the optical components (prisms) where Fresnel lens sheet 22 is applied to an image display device. These optical component specifications contain the following specific elements: an example of slant angles of refraction planes SK1 and SK2 of first and second prism groups 12a, 12b provided on the light entrance plane of Fresnel lens sheet 22; apex angles of the prisms having these refraction planes; slant angles of refraction planes SK4, SK5, and SK6 of third, fourth, and fifth prism groups 15a, 15b, 15c provided on the light exit plane thereof; and apex angles of the prisms having these refraction planes. In this example, the refractive index of a material comprising the Fresnel lens sheet is determined to be 1.53.

TABLE 2

| Incident angle | Slant angle of entrance side prism refraction plane | Prism apex angle of entrance side prism | Slant angle of exit side prism refraction plane | Prism apex angle of exit side prism |
| --- | --- | --- | --- | --- |
| 0° | — | — | — | — |
| 30° | — | — | 60° | 72.7° |
| 31° | 28° | 64° | 60.7° | 52.4° |
| 44° | 53° | 45.4° | 67.4° | 24.7° |
| 45° | 54° | 44° | 70° | 21.8° |
| 64° | 54° | 66° | 1.5° | 90.4° |
| 65° | 52.2° | 68.1° | — | — |
| 80° | 28.8° | 90.9° | — | — |

In TABLE 2, incident angles from 0° to 30° correspond to the area C, incident angles from 31° to 44° correspond to area B, and incident angles from 45° to 80° correspond to area A. Moreover, a range from 45° to 64° corresponds to a range where third prism group 15a is provided on the light exit plane. The slant angle of the prism refraction plane is decreased with increasing incident angle of light, and connects to first planar area 17 at an incident angle of 65°. Specifically, for the range of incident angles of 65°-80°, the light exit plane shall be first planar area 17. The angle values described in this paragraph are not limited to the values set forth in TABLE 2 and it is not necessary to set these particular angles as boundaries of the different prisms of the present invention. For example, several prisms may be installed in a mixed manner and in a predetermined angular range with this angle set as a center. Configuration of the Fresnel lens sheet in this way can mitigate detrimental effects, such as unevenness in the luminance among different prism areas. The aforementioned modifications can be used with the same also in the first embodiment, explained previously, as well.

Figure 10:
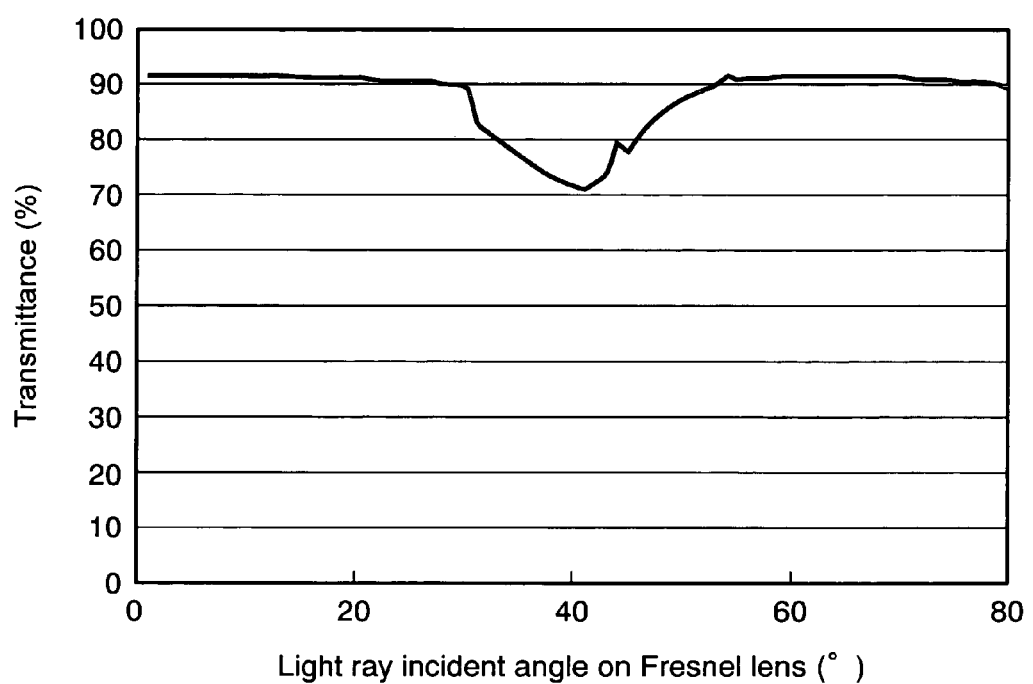
FIG. 10 is a diagram showing the transmittance of the Fresnel lens sheet according to the second embodiment of this invention as a function of light ray incident angle of the Fresnel lens sheet.

According to this embodiment, it is possible to diminish a generation rate of stray light to almost 0% regardless of the incident angle to the screen. Accordingly, since all the incident rays of light become effective rays of light, the incident angle of image light to the screen is widened and simultaneously ventilation efficiency becomes excellent. FIG. 10 shows a transmittance obtained from the embodiment of TABLE 2. Although the transmittance is degraded by up to about 20% for a range of incident angle of approximately 30°-50°, the Fresnel lens of the present invention generally exhibits excellent transmittance for a Fresnel lens that supports a range of incident angle of 0°-80°.

According to this embodiment, if Fresnel lens sheet 22 is applied to the direct view-type image display device, the image display device can also display a bright image in the periphery of the screen even when the depth dimension of the set is reduced. Therefore, in the present embodiment, in the case of an image display device of a screen diagonal of 50 inches (ratio of height vs. width=9:16), the breadth of the device can be reduced to approximately 150 mm. Of course the dimensions and characteristics of components described above are not limited to the specific values. For example, the angle and distance values associated with a slanting projection angle and a projection distance may be altered appropriately and may not require the presence or absence of the reflecting mirror, i.e., not limited to planar surface. Moreover, in this embodiment and the first embodiment, a curved mirror exhibiting free curvilinear surface may be used as reflecting mirror 25, and the prism surface (refraction plane) of the Fresnel prisms may be set as a spherical plane according to the shape of the curved mirror.

Thus, according to the present embodiment, the angular range of the screen incident angle of image light is widened and the efficiency in light passage is improved, resulting in diminishment of stray light. Accordingly, a direct view type image display device that can display a bright image and show an excellent contrast can be realized in a much more compact form.

Although, in this second embodiment, application of Fresnel lens sheet 22 to the direct view-type image display device is shown, Fresnel lens sheet 22 can also be applied to a rear projection-type image display device.

With regard to the Fresnel lens sheet explained above, when the incident angle of the incident ray of light becomes large, the following problem occurs. For example, if the prism height of the exit plane becomes higher than a given value, light will be shielded or blocked by the prism and it will become especially difficult for light to reach the vicinity of the screen end. In such a case, the image in the vicinity of the screen end becomes dark. For example, under an incident angle of 80°, the prism height becomes larger by 1 mm, and a light ray of an incident angle of 80° is made to enter a prism at a shorter distance by approximately 5.6 mm. For an incident angle of 80°, a dark part occurs in an area range away from the position of the prism by 5.6 mm in an end direction 6. In such a case, what is necessary is to apply tension to the Fresnel lens sheet to make it planar. Alternatively, the Fresnel lens sheet is warped to direct its concave surface to the light source side.

What is claimed is:

1. A Fresnel lens sheet used for an image display device, comprising:
   a light entrance plane and a light exit plane;
   a first prism group provided in an area on the light entrance plane where an incident angle of light is equal to or more than a predetermined incident angle of light;
   a second prism group provided in an area on the light entrance plane where an incident angle of light is less than the predetermined value;
   a third prism group provided in an area on the light exit plane opposite to the first prism group and proximate the second prism group; and
   a fourth prism group provided in an area on the light exit plane opposite to the second prism group,
   wherein the first prism group includes a first refraction plane that refracts the light made incident thereon at an angle equal to or more than the predetermined incident angle and a first total reflection plane that reflects the light being refracted by the first refraction plane and leads it to an exit side,
   wherein the second prism group includes a second refraction plane that refracts the light made incident thereon at an angle less than the predetermined incident angle and leads it to the exit side and a second total reflection plane that reflects the light bring refracted by the second refraction plane and leads it to the exit side,
   wherein an area of the light exit plane distal from the second prism group is planar,
   wherein the fourth prism group includes a third refraction plane that further refracts light being refracted by the second refraction plane of the second prism group and a fourth refraction plane that refracts light being reflected by the second total reflection plane of the second prism group,
   wherein light incident to the second prism group exits through the third prism group or the fourth prism group.

2. The Fresnel lens sheet according to claim 1, wherein
   light being total-reflected by the first total reflection plane of a prism group included in the first prism group that is located away from the second prism group is made to exit in a direction almost parallel to the normal of the Fresnel lens sheet,
   both light being reflected by the first total reflection plane of a prism group included in the first prism group that is located near the second prism group and light being reflected by the second total reflection plane of the second prism group are made to exit in a direction inclined inward with respect to the normal of the Fresnel lens sheet.

3. The Fresnel lens sheet according to claim 1, wherein
   the fourth prism group refracts both light being reflected by the second total reflection plane of the second prism group and light being refracted by the second refraction plane in a direction almost parallel to the normal of the Fresnel lens sheet.

4. The image display device according to claim 1, wherein
   an area of the light entrance plane of the Fresnel lens sheet on which light is made incident with an incident angle smaller than that in the area where the second prism group is provided is formed planar, and
   an area of the exit side of the Fresnel lens sheet that faces the planar area is provided with a fifth prism group for refracting light incident on the planar area.

5. The Fresnel lens sheet according to claim 4, wherein the first, second, third, fourth, or fifth prism group is in a concentric form.

6. The Fresnel lens sheet according to claim 5, wherein at least one refraction plane of the plurality of prisms is formed with an aspherical surface.

7. An image display device, comprising:
a screen;
an image source; and
a projection unit that includes a reflecting mirror for enlarging an image from the image source and projecting it on the screen;
the screen having both a Fresnel lens sheet and a diffuser sheet for diffusing light from the Fresnel lens sheet, and
the Fresnel lens sheet having both a first prism group provided in an area of a light entrance plane of the Fresnel lens sheet on which light is incident at an angle equal to or more than a predetermined incident angle of light and a second prism group provided in an area of the light entrance plane of the Fresnel lens sheet on which light is incident at an angle less than the predetermined incident angle of light,
the Fresnel lens sheet further having both a third prism group provided in an area on a light exit plane of the Fresnel lens sheet opposite to the first prism group and proximate the second prism group and a fourth prism group provided in an area on the light exit plane opposite to the second prism group,
wherein the first prism group includes a first refraction plane that refracts light made incident thereon at an angle equal to or more than the predetermined incident angle of light and a first total reflection plane that reflects the light being refracted by the first refraction plane and leads it to the exit side of the Fresnel lens sheet,
wherein the second prism group includes a second refraction plane that refracts light made incident thereon at an angle less than the predetermined incident angle of light and a second total reflection plane that reflects a part of the light being refracted by the second refraction plane and leads it to the exit side of the Fresnel lens sheet,
wherein an area of the light exit plane distal from the second prism group is planar,
wherein the fourth prism group includes a third refraction plane that further refracts light being refracted by the second refraction plane of the second prism group and a fourth refraction plane that refracts light being reflected by the second total reflection plane of the second prism group,
wherein light incident to the second prism group exits through the third prism group or the fourth prism group.

8. An image display device, comprising:
an image source for displaying an image by modulating incidence light;
a lamp for emitting light;
a projection unit that includes a reflecting mirror for projecting the light emitted from the lamp on a display area of the image source; and
a Fresnel lens sheet that directs light from the projection unit in a direction substantially perpendicular to a display surface of the image source and makes it exit to the image source,
the Fresnel lens sheet having a first prism group provided in an area of a light entrance plane of the Fresnel lens sheet on which light is incident at an angle equal to or more than a predetermined incident angle of light and a second prism group provided in an area of the light entrance plane of the Fresnel lens sheet on which light is incident at an angle less than the predetermined incident angle of light,
the Fresnel lens sheet further having both a third prism group provided in an area on a light exit plane of the Fresnel lens sheet opposite to the first prism group and proximate the second prism group and a fourth prism group provided in an area on the light exit plane opposite to the second prism group,
the first prism group including a first refraction plane that refracts the light made incident thereon at an angle equal to or more than the predetermined incident angle and a first total reflection plane that reflect the light being refracted by the first refraction plane and leads it to the exit side of the Fresnel lens sheet,
the second prism group including a second refraction plane that refracts the light made incident thereon at an angle less than the predetermined incident angle and a second total reflection plane that reflect a part of the light being refracted by the second refraction plane and leads it to the exit side of the Fresnel lens sheet,
wherein an area of the light exit plane distal from the second prism group is planar,
wherein the fourth prism group includes a third refraction plane that further refracts light being refracted by the second refraction plane of the second prism group and a fourth refraction plane that refracts light being reflected by the second total reflection plane of the second prism group,
wherein light incident to the second prism group exits through the third prism group or the fourth prism group.

9. The image display device according to claim 8, wherein the reflecting mirror includes a curved mirror whose reflecting surface is curved, a reflecting surface of each prism is in an aspherical form, and
an aspherical surface coefficient of the refraction plane of the prism is set in such a way that image light being reflected by the curved mirror and made incident on the Fresnel lens sheet may exit from an exit plane of the Fresnel lens sheet at an exit angle of substantially 00 for substantially whole plane of the Fresnel lens sheet.

10. The image display device according to claim 8, further comprising:
an element for fixing the Fresnel lens sheet to the case of the image display device by applying tension to a periphery of the Fresnel lens sheet.

11. The image display device according to claim 8, wherein the Fresnel lens sheet is fixed to the case of the image display device being warped to direct its concave to the lamp side.

12. The image display device according to claim 8, wherein the image source is a liquid crystal display panel, and light rays made incident on a display surface of the liquid crystal panel becomes substantially parallel to the normal of the liquid crystal panel.

13. The image display device according to claim 12, wherein
the image display device is a transparent liquid crystal panel.

* * * * *